United States Patent [19]

Barwell

[11] 3,789,475
[45] Feb. 5, 1974

[54] METHOD OF AND APPARATUS FOR TRUING SPOKED WHEEL
[75] Inventor: Ian John Barwell, Lae, Guinea
[73] Assignee: Raleigh Industries Limited, Nottingham, England
[22] Filed: Jan. 5, 1973
[21] Appl. No.: 283,034

[52] U.S. Cl.............................. 29/159.02, 29/240
[51] Int. Cl........................... B21f 39/00, B21k 1/34
[58] Field of Search. 29/159.01, 159.02, 240, 200 B

[56] References Cited
UNITED STATES PATENTS
| 1,399,770 | 12/1921 | House, Jr. | 29/159.02 |
| 1,921,223 | 8/1933 | Eksergian | 29/159.02 |
| 1,979,966 | 11/1934 | Farr et al. | 29/159.02 |
| 3,507,027 | 4/1970 | Jaulmes | 29/159.02 |

Primary Examiner—Charles W. Lanham
Assistant Examiner—V. A. Dipalma
Attorney, Agent, or Firm—Bierman & Bierman; Jordan B. Bierman; Linda G. Bierman

[57] ABSTRACT

A method and apparatus for truing a spoked wheel is disclosed whereby a hub and rim, after having spokes threaded and secured by nipples, are located in a clamping device and the spoke nipples are partially tightened by rotating the clamped wheel relative to a resilient band, then offsetting the hub relative to the rim in one direction and then in the other over a fixed distance and rotating the clamped wheel after each offsetting action to tighten further a series of the spoke nipples by causing them to rotate as they are contacted by the resilient band means and repeating the alternating offsetting actions and intermediate nipple tightening until the wheel becomes substantially true.

12 Claims, 6 Drawing Figures

METHOD OF AND APPARATUS FOR TRUING SPOKED WHEEL

This invention concerns wheel production and in particular the production of spoked wheels intended for use in the production of bicycles, tricycles, mopeds and the like.

One of the problems associated with the assembly and truing of spoked wheels lies in the correct tensioning of the spokes to produce a wheel which will run true. In the past it has been necessary to use skilled personnel for the building of spoked wheels and despite the fact that a skilled person can produce a wheel which is acceptable for use, the time taken to build the wheel is of necessity relatively lengthy.

It is the primary object of the present invention to provide a method and an apparatus which will enable true wheels to be produced in a more economical manner than has hitherto been possible.

According to one aspect of the present invention, the method of truing a spoked wheel subsequent to carrying out the steps of threading spokes into a hub and a rim and loosely attaching spoke nipples to the spokes, is characterised by locating the wheel hub and rim in a clamping device with the hub axis initially at least a centralised relative to the rim, partially tightening the spoke nipples by rotating the clamped wheel relative to a resilient band means to rotate the spoke nipples relative to their spokes, offsetting the hub relative to the rim first in one direction and then in the other over a fixed distance and rotating the clamped wheel after each offsetting action to tighten further a series of the spoke nipples by causing them to rotate as they are contacted by the resilient band means and repeating the alternating offsetting actions and intermediate nipple tightening actions until the wheel becomes substantially true. Conveniently the hub is offset along its axis relative to the rim; alternatively it may be eccentrically or angularly offset.

According to a further aspect of the present invention one form of apparatus for producing a spoked wheel includes a hub clamping means and a rim clamping means, both of said means being rotatable collectively there being a device associated with the clamping means for centering the hub relative to the rim in the axial direction of the hub and means for offsetting the hub relative to the rim in the axial direction of the hub and resilient band means movable towards and away from the rim clamping means whereby, in use, as the clamping means is rotated whilst holding a rim and a hub into which spokes have been laced the resilient means may be moved towards the rim clamping means to contact and rotate spoke nipples to tighten them on the spokes.

In an alternative form of apparatus the hub clamping means is arranged to cause the hub to be offset eccentrically and in a still further alternative form of apparatus the hub clamping means is arranged to cause the hub to be angularly offset.

Preferably the resilient band means consists of two bands one of which can be moved relative to the other.

The invention will now be described further, by way of example only, with reference to several practical forms thereof, and the accompanying drawings in which.

Figure 1:
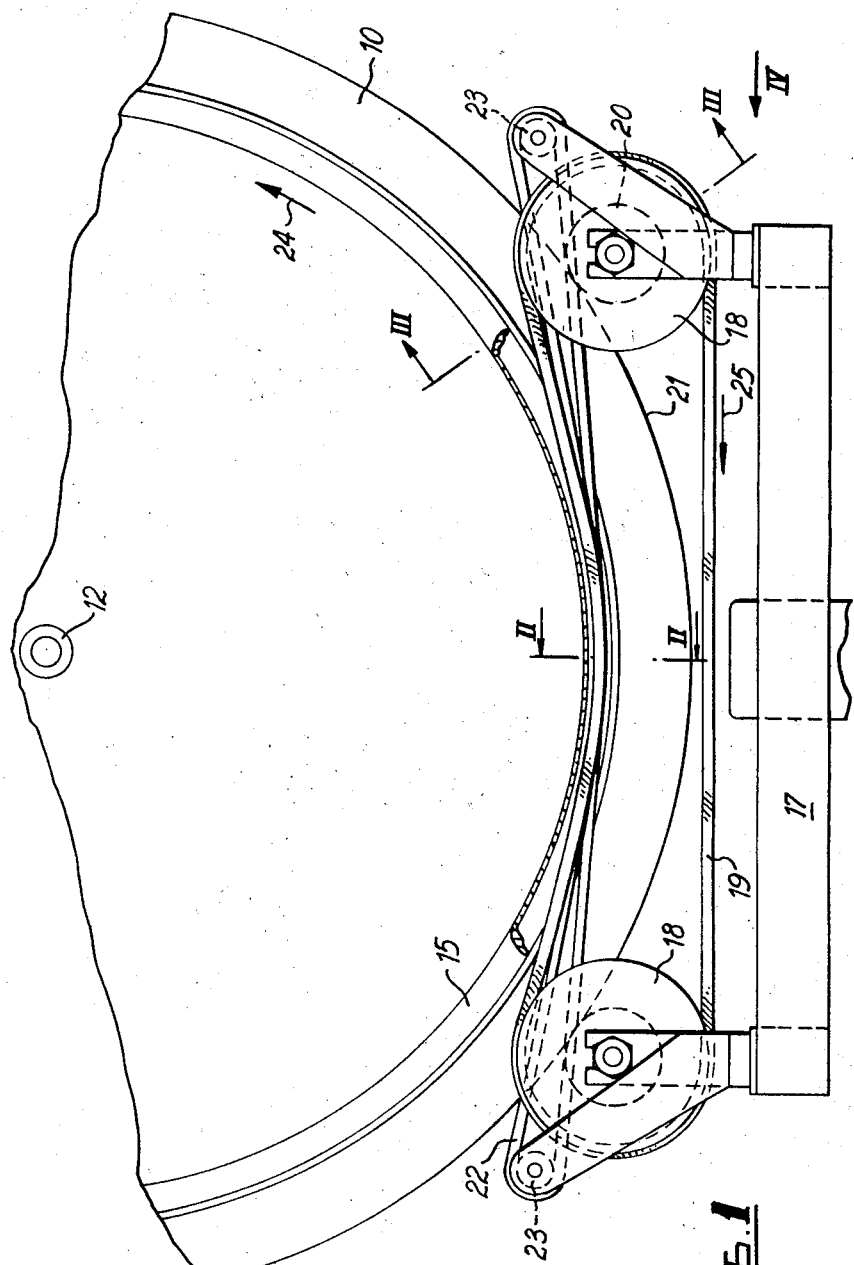
FIG. 1 is a schematic plan view of part of an apparatus made in accordance with one form of the invention.

Reference will first be made to FIGS. 1 to 4 of the drawings which illustrate schematically one form of the apparatus used for truing a spoked wheel. The apparatus consists basically of a framework (not shown) upon which is secured a bed plate 10 of annular form having adjacent its outer periphery a wheel rim retaining flange 11 (see FIGS. 2 and 3). In the centre of the bed plate and fixed to the framework is a carrier 12 (see FIG. 1) for a movable wheel hub spindle receiving element.

Mounted on the framework above the bed plate 10 is a movable annular platen 13 which has a wheel rim receiving groove 14 adjacent its periphery. This platen is movable towards and away from the bed plate 10. Mounted centrally of the platen 13 is a carrier not shown for a second, movable, wheel hub spindle receiving element.

If desired the annular platen 10 can be used as the movable platen and the annular platen 13 can be used as the bed plate, or in fact the two platens can be mounted in a vertical position as opposed to the horizontal position described.

The platen 13 and the second, movable, hub spindle receiving element may be moved in synchronism but they are capable of being independently controlled for a purpose referred to below.

The bed plate 10 and platen 13 are mounted rotatably upon the framework.

Figure 2:
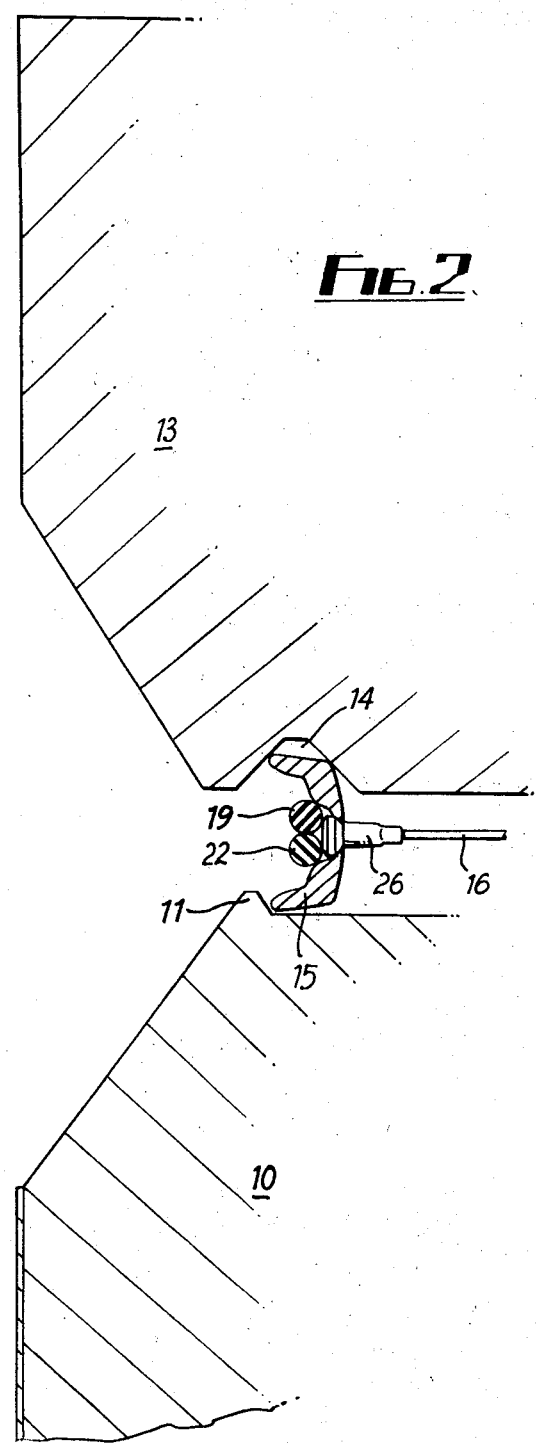
FIG. 2 is a schematic part sectional view of part of the apparatus of FIG. 1 taken on the line II — II of FIG. 1.
Figure 3:
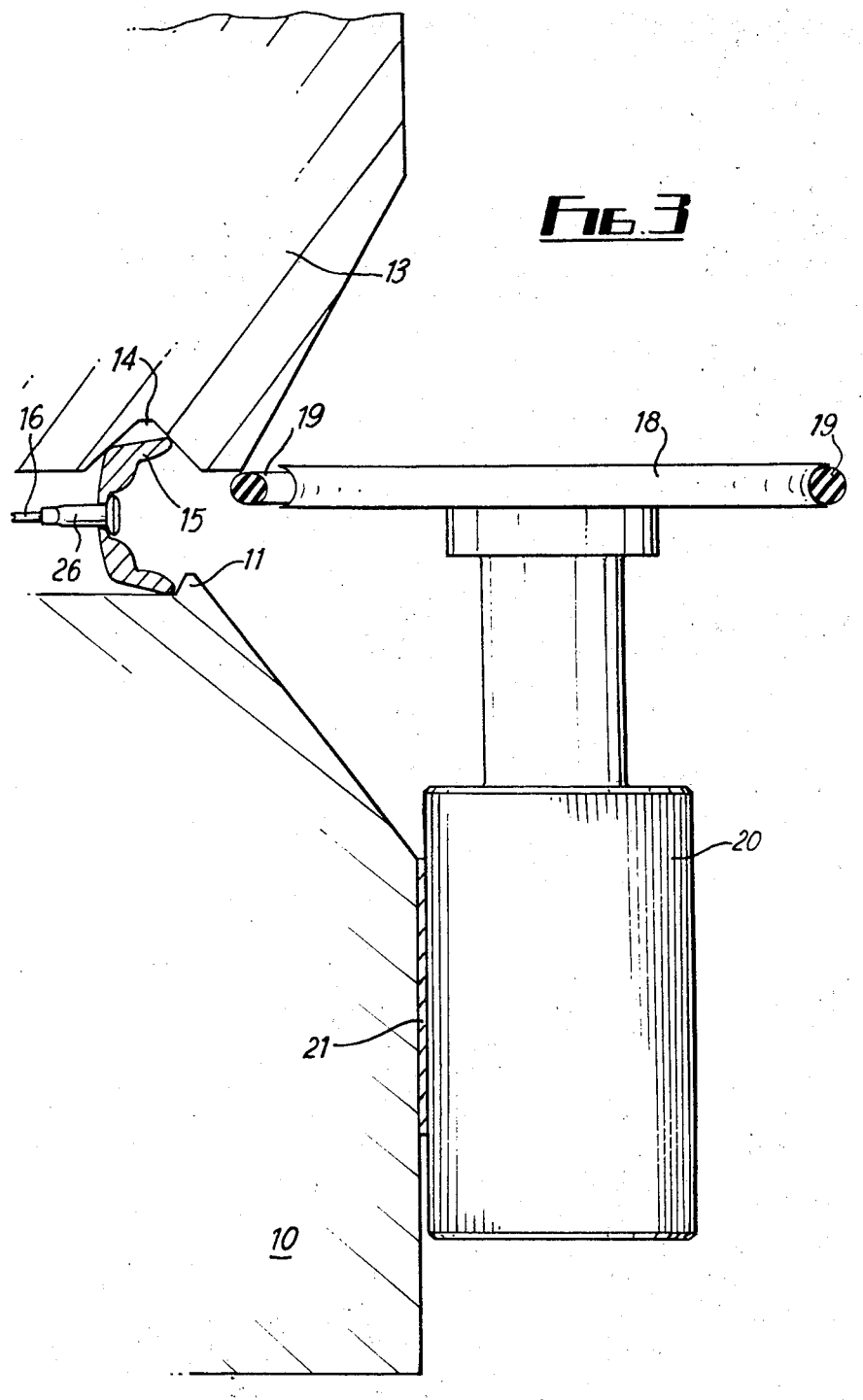
FIG. 3 is a schematic part sectional view of part of the apparatus of FIG. 1 taken on the line III — III of FIG. 1, in this view part of the resilient band means is not shown, and additionally that part of the band means shown is in an inoperative position.
Figure 4:
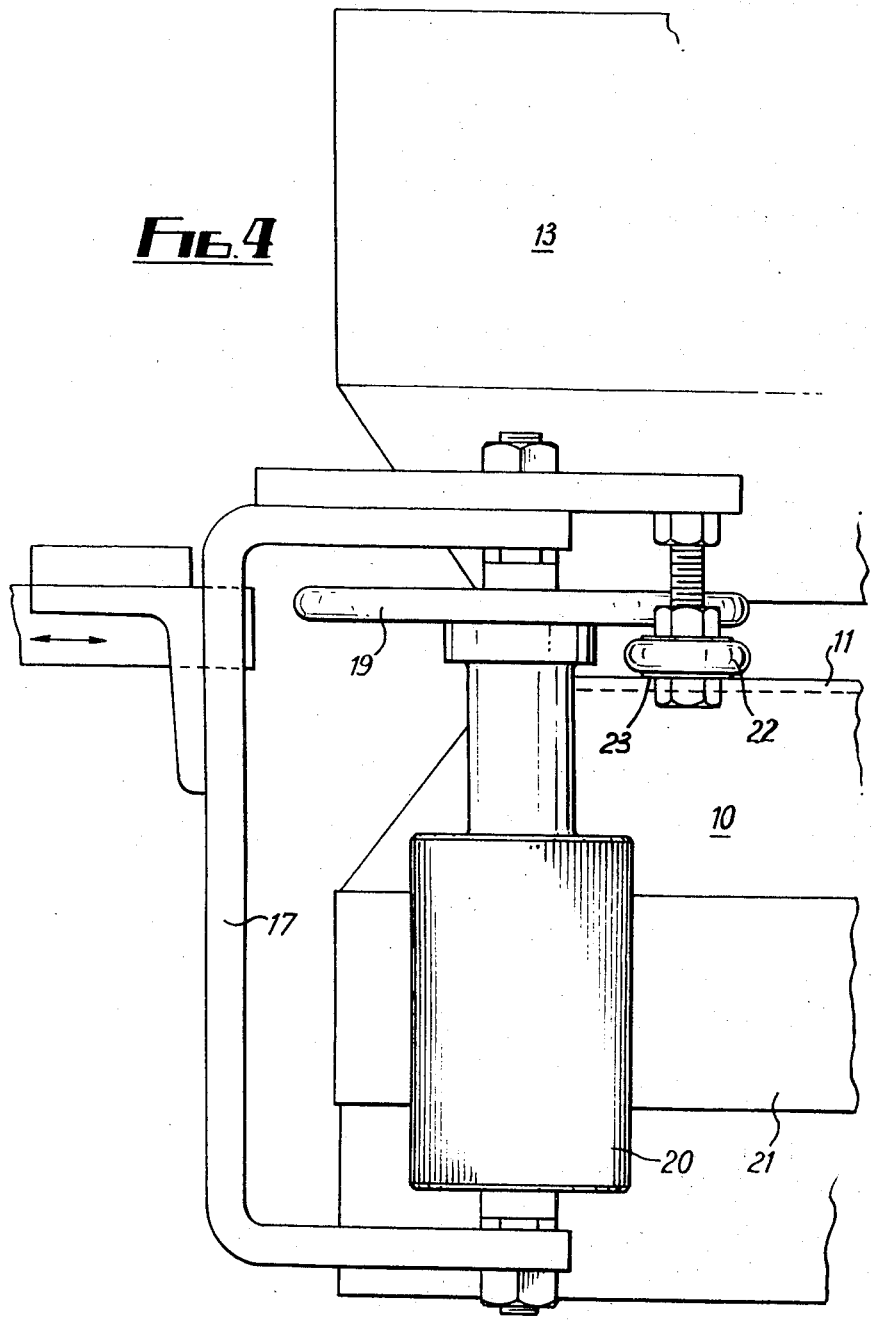
FIG. 4 is a schematic view of part of the apparatus of FIG. 1 taken from the view point indicated by the arrow 4 on FIG. 1 and FIGS. 5 and 6 are diagrammatic illustrations showing part of a wheel and indicating how, with minor modification of the apparatus of FIGS. 1 to 4 alternative methods of wheel truing can be achieved.

A wheel rim 15 and part of a spoke 16 is shown in position in FIGS. 2 and 3, whereas in FIG. 1 only the wheel rim 15 is shown.

Outwardly of the bed plate 10 is provided a carrier frame 17 for an elastically deformable band means. The carrier frame 17 is reciprocable towards and away from the bed plate 10.

The various movements of the platens 10 and 13 the wheel hub spindle receiving elements 12 and the carrier frame 17 may be controlled hydraulically, pneumatically, electrically or mechanically and the rotation of the bed plate 10 and platen 13 is conveniently electrically or mechanically controlled.

The carrier frame 17 has mounted thereon two pulleys 18 for a first element 19 of the resilient band means, this element 19 being in the form of an endless belt which is driven as the bed plate 10 rotates. The drive for the element 19 is by means of a pair of knurled wheels 20 which bear against a flat friction material covered edge 21 of the bed plate 10.

Also mounted on the carrier frame 17 is a second endless band 22, this being carried by a pair of non rotatable band carriers 23. The second endless band 22 is thus non rotatable.

The arrows 24 and 25 of FIG. 1 show the directions of motion respectively of the bed plate 10 and the element 19 and the ratio between the driving diameter of the wheels 20 and pulleys 18 is 2 : 1 so that the velocity of the moving element 19 is twice the peripheral velocity of the wheel rim 15.

In use, a wheel comprising a hub (not shown) rim 15 and loosely fastened spokes 16 is placed in position with the wheel rim 15 resting against the flange 11 of the bed plate 10. The hub spindle is located in the receiving element 12 and the platen 13 is lowered, together with the second hub spindle receiving element so that the hub can be accurately centered relative to the rim 15 and both the rim 15 and hub are now gripped. The bed plate 10 and platen 13 are rotated thus rotating the wheel about its spindle and the carrier frame 17 is moved towards the bed plate 10 so that its elastically deformable bands 19 and 22 bear against the ends of spoke nipples 26 and the band 19 is driven as the wheels 20 bear against the bed plate 10 and thus causes the tightening on the spokes 16. As shown in FIG. 1 the bands bear against an arc of the wheel rim, this length of contact can be varied to enable wheels of all sizes to be trued, and in fact a series of carrier elements can be mounted at closely spaced positions over an arc of wheel rim 15 if desired.

The carrier 17 is now retracted from the bed plate 10 and the rotary motion is stopped. Pressure is now exerted on the hub by, say the second hub spindle receiving element to cause the hub and spindle to move along the axis of the spindle to laterally offset the hub relative to the rim 15 and thus cause one set of spokes to be put into tension and the others to be pushed through spoke holes in the rim 15. The bed plate 10 is now rotated and the carrier plate 17 moved towards the bed plate 10 to cause the nipples 26 of the projecting set of spokes 16 to be tightened further by the bands 19 and 22.

The carrier 17 is now retracted and the rotary motion stopped. The hub is then pushed in the opposite direction to laterally offset it relative to the rim 15 by an amount equal to that originally applied. This causes the just tightened spokes 16 to be placed under tension and the other set to protrude through the wheel rim 15 to enable them to be tightened by a repetition of the stops of rotating the bed plate 10 and advancing the carrier 17 to bring the bands 19 and 22 into contact with the spoke nipples 26 of the protruding spokes 16.

At this point in the process the spokes 16 may be sufficiently tensioned to produce a true wheel, if not the steps described so far are repeated until the spokes 16 are at the requisite tension and the wheel is in fact true.

An alternative manner in which the apparatus is used consists in gripping the rim 15 and the hub and thereafter retaining the carrier 17 in a fixed position throughout the truing operation. The steps of offsetting the hub axially in relation to the rim 15 is, of course, still carried out a sufficient number of times to ensure that the required spoke tension is achieved.

Figure 5:
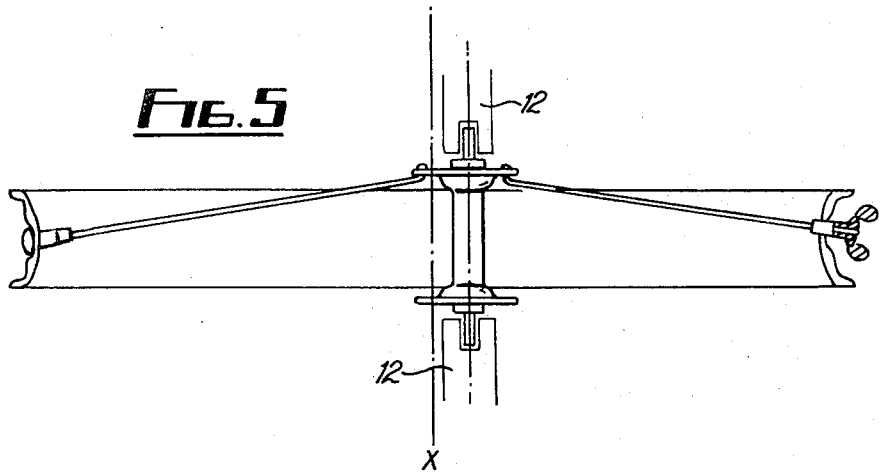

The invention is not restricted to the details set out above and reference will now be made to FIGS. 5 and 6. In the apparatus used to carry out the method shown in FIG. 5 the means used to cause the spokes 16 to protrude from the rim wheel 15 in order that the nipples may be tightened, comprises means whereby after initially centering the hub it can thereafter be eccentrically offset. This comprises means whereby the spindle gripping means 12 can be moved to one side of the rim centre line for each full revolution of the wheel rim, the maximum offset coinciding with the position of the resilient bands 19 and 22 so that the spokes can be correctly tensioned as the wheel is rotated.

Figure 6:
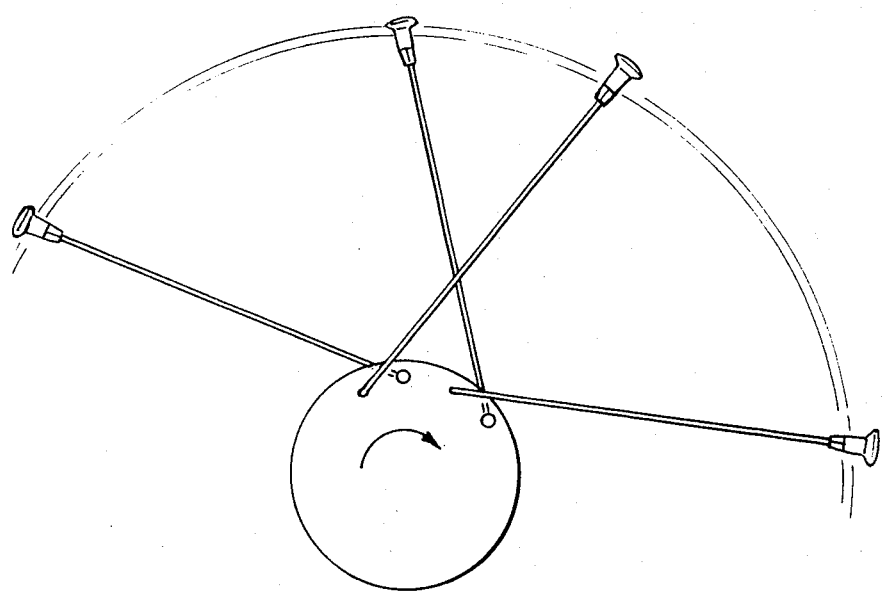

The same action can be achieved by angular offsetting the hubs to result, as shown in FIG. 6 in the moving of the spokes 16 through the holes in the rim 15 to enable them to be tensioned. Facilities for this are again incorporated in the spindle receiving elements 12. In order that all spokes receive the same degree of tensioning the hub requires both clockwise and counterclockwise offset. This causes alternate pairs of spokes to protrude above the rim face in the region of the resilient bands 19 and 22.

Whilst it may be possible to tighten spoke nipples using only one resilient band it is preferable to increase the effective torque required to tighten the nipples by arranging (as described) for each nipple to come into contact with two resilient bands simultaneously.

It should be borne in mind that the process and apparatus described above results in the production of a wheel which has advantages other than those of being true and easily produced.

One of the advantages lies in the fact that it is possible to use spoke nipples which have no slot machines in the head and thus the latter can be smooth making it unnecessary to use the usual textile tape to cover the nipples to prevent chafing of a wheel inner tube. It is necessary to ensure that the spoke ends do not project beyond the heads of the nipples and to achieve this the nipples are longer than those used in conventional wheel building so that the spokes can be shorter and thus can be sufficiently tightened without risk of the ends protruding beyond the heads of the nipples. It is found sufficient to have nipples which are one eighth of an inch greater length than those used conventionally. It should also be borne in mind that the final tension in the spokes can be varied within limits, that is to say the greater the hub is offset relative to the rim, the higher will be the tension in the spokes when the wheel is finally trued.

I claim:

1. The method of truing a spoked wheel subsequent to carrying out the steps of threading spokes into a hub and a rim and loosely attaching spoke nipples to the spokes characterised by locating the wheel hub and rim in a clamping device with the hub axis initially at least centralised relative to the rim, partially tightening the spoke nipples by rotating the clamped wheel relative to a resilient band means to rotate the spoke nipples relative to their spokes, offsetting the hub relative to the rim first in one direction and then in the other over a fixed distance and rotating the clamped wheel after each offsetting action to tighten further a series of the spoke nipples by causing them to rotate as they are contacted by the resilient band means and repeating the alternating offsetting actions and intermediate nipple tightening actions until the wheel becomes substantially true.

2. The method as claimed in claim 1 in which the hub is offset along its axis first in one direction and then the other until the wheel is true.

3. The method as claimed in claim 1 in which the hub is offset eccentrically relative to the rim axis.

4. The method as claimed in claim 1 in which the hub is offset angularly relative to the rim axis.

5. Apparatus for carrying out the method claimed in claim 1 including a hub clamping means and a rim clamping means, both of said means being rotatable collectively, there being a device associated with the clamping means for centering the hub relative to the rim in the axial-direction of the hub and means for offsetting the hub relative to the rim in the axial direction of the hub and resilient band means movable towards and away from the rim clamping means whereby, in use, as the clamping means is rotated whilst holding a rim and a hub into which spokes have been laced the resilient means may be moved towards the rim clamping means to contact and rotate spoke nipples to tighten them on the spokes.

6. Apparatus for carrying out the method claimed in claim 1 in which a wheel hub gripping means is provided and in which means for offsetting it eccentrically relative to the wheel rim centre line is provided.

7. Apparatus for carrying out the method as claimed in claim 1 in which wheel hub gripping means are provided and in which means for offsetting the gripping means angularly relative to the hub centre line are provided.

8. Apparatus as claimed in claim 5 in which the resilient band means comprises a pair of endless resilient bands.

9. Apparatus as claimed in claim 8 in which one band is fixed and the other is movable.

10. Apparatus as claimed in claim 5 in which there is provided at least one carrier means for the resilient band means, said carrier being movable towards and away from the rim clamping means.

11. Apparatus as claimed in claim 9 in which the movable band is driven by means of driving wheels mounted on a band carrier means, said driving wheels being arranged to be rotated by one of the rim clamping means thereby to rotate pulleys on which the movable band is mounted.

12. Apparatus as claimed in claim 11 in which the ratio of driving wheel diameter to pulley diameter is 2 : 1 whereby a band velocity of twice the peripheral velocity of the rim is achieved.

* * * * *